United States Patent Office 3,749,721
Patented July 31, 1973

3,749,721
PROCESS FOR THE PRODUCTION OF PURE HEXETIDINE
Wolfgang Herrmann and Gerhard Satzinger, Gundelfingen, Freiburg, Germany, assignors to Warner-Lambert Pharmaceutical Company, Morris Plains, N.J.
No Drawing. Filed Nov. 2, 1970, Ser. No. 86,330
Claims priority, application Germany, Mar. 7, 1970, P 20 11 078.5
Int. Cl. C07d 51/18
U.S. Cl. 260—256.4 H    6 Claims

ABSTRACT OF THE DISCLOSURE

A process for purifying hexetidine is disclosed. This process comprises forming the sparingly soluble 1,5-naphthalenedisulfonate acid salt of hexetidine in an aqueous aliphatic alcohol and regenerating hexetidine from said salt by treatment with an alkali.

Hexetidine (1,3 - bis-($\beta$-ethylhexyl)-5-methyl-5-aminohexahydropyrimidine) is one of the larger group of 5-aminohexahydropyrimidines disclosed in U.S. Patent No. 2,387,043. Hexetidine has the following formula:

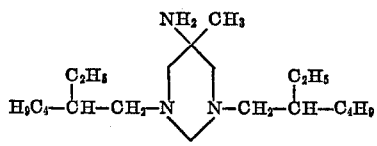

Owing to its marked antimicrobial activity it is useful as the active ingredient in various antiseptic preparations as disclosed in U.S. Patent No. 2,837,463.

When synthetically prepared, as disclosed in the prior art which includes the step of hydrogenating the corresponding 5-nitrohexahydropyrimidine, the crude material, besides the desired hexetidine, also includes a number of other by-products which may comprise 20% of the crude product. These by-products are primarily 2,6-bis-($\beta$-ethylhexyl)-hexahydro-7$\alpha$-methyl - 1H-imidazo-[1,5-e]-imidazole and $N_1,N_3$-bis-(ethylhexyl)-2-methyl-1,2,3-propanetriamine, with the other by-product substances being found in minor amounts only.

The purification of hexetidine to effect a separation of the by-products by ordinary fractional distillation is not entirely feasible since the boiling points of hexetidine and of the impurities are almost identical. While thin-film evaporation is a more effective distillation procedure any exposure to heat tends to produce additional impurities.

We have now found that the industrial-scale separation of impurities from hexetidine to yield a product having a purity of more than 99% may be achieved if one forms the sparingly soluble hexetidine-naphthalene-1,5-disulfonate salt in a suitable solvent medium and separates this salt selectively from solution. By use of naphthalene-1,5-disulfonic acid under the selected solvent conditions, the salts of those by-products or impurities usually found in the crude hexetidine are much more readily soluble and remain in solution when the separation is carried out according to the invention. Suitable solvents for use in this separation procedure are the lower aliphatic alcohols, including methanol, ethanol, propanol, isopropyl alcohol, butanol, isobutanol, or tertiary butanol, for example, or their mixtures with water; preferably an aqueous 60–70% isopropyl alcohol solution is used.

By introducing the hexetidine-naphthalene-1,5-disulfonic acid salt into aqueous alkali, preferably dilute sodium hydroxide solution, the free hexetidine base is regenerated and can be taken up in an organic solvent immiscible with water using an extraction step. A low boiling water-immiscible organic solvent such as petroleum ether is very suitable. By cautiously distilling off the low boiling solvent under vacuum to avoid excessive heating, the desired pure hexetidine is obtained.

The purification process according to this invention is performed as follows:

EXAMPLE 1

15 kg. (44.2 mols) of crude hexetidine containing 79.6% of hexetidine are dissolved in 30 liters of isopropyl alcohol; then the solution is heated to 50–60° C. A filtered solution (50 to 60° C.) of 8.15 kg. (22.1 mols) of 78% naphthalene-1,5-disulfonic acid in 45 liters of isopropyl alcohol is added to this solution while stirring. Subsequently 3 liters of water at 50–60° C. are added while stirring. With continued stirring, the product is slowly cooled to ca. 20° C.; the separated crystals are removed by centrifuging, then washed with 25 liters of 70% isopropanol and dried at 40–50° C. The yield amounts to 16.7 kg. of colorless crystals, M.P. 190–191° C. This corresponds to a yield of 96% based on the hexetidine content of the crude hexetidine used.

For regenerating the base, 16.7 kg. (17.3 mols) of the hexetidine-naphthalene-1,5-disulfonate are added to a solution of 2.1 kg. (52 mols) of sodium hydroxide in 105 liters of water. Following addition of 60 liters of petroleum ether (B.P. 50–70° C.) the solution is stirred until the salt has completely dissolved (ca. 1 hour). The organic phase is removed and washed first with dilute sodium hydroxide solution, then with water, after which it is dried. Subsequently, the solvent is distilled off under vacuum. The yield obtained amounts to 11.4 kg. (97% of theory) of colorless hexetidine oil.

Content (by titration): 100.3%
Content of hexetidine (GLC): 99.5%
Refractive index $n_D^{20}$: 1.4640

Elementary analysis: $C_{21}H_{45}N_3$ (339.61): Calcd. (percent): C, 74.28; H, 13.35; N, 12.37. Found (percent): C, 74.05; H, 13.41; N, 12.48.

EXAMPLE 2

340 g. (1 mol) of 80% crude hexetidine are dissolved in 1 liter of methanol, and to this a filtered solution of 165 g. (0.5 mol) of 87% naphthalene-1,5-disulfonic acid in 1.4 liters of methanol is added. To the clear solution 1 liter of water is added slowly while stirring. The diluted mixture is allowed to stand overnight, and then the crystals are separated in a suction filter, washed with 70% methanol, and dried. The yield amounts to 362 g. of hexetidine-naphthalene-1,5-disulfonate, or 93.5% of theory, related to the hexetidine content of the crude hexetidine treated.

For regenerating the pure base, the salt is suspended in a stoichiometric excess of aqueous sodium hydroxide solution, and then 1.5 liters of petroleum ether (B.P. 60–80° C.) are added to the suspension. Subsequently, the solution is stirred until the salt has dissolved; the organic phase is then removed, dried and the solvent distilled off under vacuum to yield purified hexetidine oil. The yield of pure hexetidine obtained (99% purity) amounts to 218 g. or 86% of theory based on the hexetidine content of the crude mixture treated.

We claim:
1. In a process for the separation of hexetidine from a mixture comprising hexetidine and 2,6-bis-($\beta$-ethylhexyl)-hexahydro-7$\alpha$-methyl - 1H - imidazo-[1,5e]-imidazole and $N_1,N_3$-bis-(ethylhexyl-2-methyl-1,2,3-propanetriamine the steps which comprise forming a naphthalene-1,5-disulfonic acid salt of hexetidine in a reaction medium comprising lower alkanol which is a nonsolvent for said salt whereby the salt formed precipitates, and separating the precipitated naphthalene-1,5-disulfonate salt from the solvent.

2. Process in accordance with claim 1 wherein the hexetidine is regenerated by treatment of said naphthalene-1,5-disulfonic acid salt with an aqueous alkaline solution.

3. Process in accordance with claim 1 in which the nonsolvent reaction medium comprises a lower alkanol or mixtures thereof with up to 80% of water.

4. Process in accordance with claim 3 wherein the lower alkanol is isopropyl alcohol.

5. Process in accordance with claim 3 wherein the lower alkanol is methanol.

6. Process in accordance with claim 2 wherein said aqueous alkaline solution is an aqueous solution of sodium hydroxide.

References Cited

UNITED STATES PATENTS 2,990,404   6/1961   Tindall _____ 260—256.4

ALEX MAZEL, Primary Examiner

R. V. RUSH, Assistant Examiner

U.S. Cl. X.R.

260—309, 583 P